United States Patent [19]
Engel

[11] Patent Number: 5,594,938
[45] Date of Patent: Jan. 14, 1997

[54] UNIVERSAL TV INTERFACE FOR SWITCH OF BROADCAST VIDEO DISTRIBUTION (AND RELATED METHOD)

[75] Inventor: Joel S. Engel, Highland Park, Ill.

[73] Assignee: Ameritech Services, Inc., Hoffman Estates, Ill.

[21] Appl. No.: 440,330

[22] Filed: May 11, 1995

Related U.S. Application Data

[63] Continuation of Ser. No. 18,109, Feb. 17, 1993, abandoned.
[51] Int. Cl.⁶ .................................................. H04N 7/10
[52] U.S. Cl. ............................ 455/6.2; 348/11; 348/10; 348/731
[58] Field of Search ................... 348/10, 11, 6, 348/7, 8, 9, 12, 13, 563, 564, 565, 553, 725, 726, 731; 455/3.1, 3.2, 4.1, 4.2, 5.1, 6.2; 380/10, 20; H04N 7/00, 7/173, 7/16, 7/20, 7/22, 5/49, 5/445, 5/45

[56] References Cited

U.S. PATENT DOCUMENTS

| 3,643,164 | 2/1972 | Sly et al. ................................. 455/6.2 |
| 4,577,220 | 3/1986 | Laxton et al. ............................ 358/84 |
| 4,697,209 | 9/1987 | Kiewit et al. . |
| 4,710,971 | 12/1987 | Nozaki et al. . |
| 4,717,970 | 1/1988 | Long . |
| 4,723,302 | 2/1988 | Fulmer et al. . |
| 4,771,456 | 9/1988 | Martin et al. ............................ 380/10 |
| 4,783,846 | 11/1988 | Wachob . |
| 4,841,368 | 6/1989 | Rumbolt et al. ..................... 455/352 X |
| 4,864,613 | 9/1989 | Van Cleave ............................ 380/13 |
| 4,876,736 | 10/1989 | Kiewit . |
| 4,972,503 | 11/1990 | Zurlinden . |
| 5,046,093 | 9/1991 | Wachob . |
| 5,123,046 | 6/1992 | Levine ............................ 455/151.2 X |

FOREIGN PATENT DOCUMENTS

| 432676A2 | 6/1991 | European Pat. Off. . |
| 0432676 | 6/1991 | European Pat. Off. ........ H04N 7/160 |
| 2573266 | 5/1986 | France ................................ 380/10 |
| 0044201 | 3/1980 | Japan .................................. 455/6.2 |
| 0207076 | 9/1987 | Japan ............................... H04N 5/44 |
| 0231572 | 10/1987 | Japan ............................... H04N 5/44 |
| 0166385 | 7/1988 | Japan ............................. H04N 7/167 |
| 0254086 | 10/1989 | Japan ............................. H04N 7/160 |

Primary Examiner—David E. Harvey
Attorney, Agent, or Firm—Willian Brinks Hofer Gilson & Lione

[57] ABSTRACT

A multi-purpose interface apparatus for a television receiver for digital or analog, broadcast or switched video distribution systems is provided which eliminates the necessity of having the user operate a separate set-top cable converter at the location of the subscriber in order to receive any switched or broadcast, digital or analog CATV offering transmitted to the subscriber by the cable service provider, regardless of the particular type of cable service requested by the subscriber from the cable service provider (i.e., basic cable program offering, a scrambled premium program offering and/or a pay-for-view program offering). This interface will also be fully capable of operating with novel CATV distribution systems, including all prospective video dial tone systems. Also disclosed is a related method.

24 Claims, 5 Drawing Sheets

UNIVERSAL TV INTERFACE FOR SWITCH OF BROADCAST VIDEO DISTRIBUTION (AND RELATED METHOD)

This application is a continuation of application Ser. No. 08/018,109, filed Feb. 17, 1993, now abandoned.

BACKGROUND OF THE INVENTION

This invention generally pertains to apparatus for interfacing a subscriber's receiver with either analog or digital video distribution systems, and more particularly to a multi-purpose television interface, and related method, which eliminates the necessity for a user to interact with a dedicated and separate set-top cable converter at the location of the subscriber in order to receive the switched or broadcast, digital or analog cable offering being transmitted to the subscriber by the cable service provider, regardless of the particular type of cable service (i.e., basic or standard program offerings, premium program offerings and/or pay-for-view program offerings) requested by the subscriber from the cable service provider; further, the subject interface will also be fully capable of operating with novel CATV distribution systems, including all prospective video dial tone systems that are presently under review by the Federal Communications Commission.

SUMMARY OF THE INVENTION

By way of background information, CATV programming has the following commercial offerings, namely: (i) basic program offerings, which are received with a regular monthly subscription for cable programming by the cable subscriber; (ii) premium program offerings, addressable or otherwise, each of which is transmitted over cable in a scrambled (or blocked) format and only becomes descrambled for a particular cable subscriber after the particular cable subscriber has specifically ordered the premium cable service from the cable service provider; and most recently, (iii) addressable pay-for-view program offerings, which are transmitted over cable in a scrambled (or encoded) format and which only become decoded for a particular cable subscriber after the cable subscriber has specifically ordered the pay-for-view program offering from the cable service provider.

Current CATV distribution systems, specifically for analog broadcast CATV, can deliver a wide band of analog signals consisting of many individual channels (i.e., 30–100 or so video channels). The incoming analog signal is similar to those analog signals which can be received by a standard broadcast TV antenna, but the specific channel frequencies for CATV are not the same as standard broadcast television. Accordingly, in order for the cable subscriber to be able to receive these incoming frequencies (representing specific program selections), in order to view one particular channel (since the television receiver of the cable subscriber is not able to tune these incoming frequencies), the cable subscriber is required to use a separate set-top cable converter, which is operatively connected to the cable subscriber's television receiver. The cable subscriber will typically fixed tune his TV receiver to channel 3 (or channel 4, whichever is not used for broadcast television in the specific geographic location), and thereafter, using the set-top cable converter, select a specific channel for program viewing. The set-top cable converter will then tune to the channel selected, and receive the incoming signal for the particular channel, and then shift the output signal to the particular frequency of either broadcast channel 3 (or channel 4), to which the cable subscriber's television receiver has been previously fixed tuned, after which the selected channel can be viewed on the cable subscriber's television receiver. Note that the set-top cable converter functions as the active channel tuner for the television receiver, and the channel tuner of the television is not actively used to selected channels to be viewed, since the television receiver is fixed tuned to either channel 3 or channel 4. Should the television receiver have a portable or hand-held remote control apparatus for channel selection, the remote control apparatus will not be able to be used to control the channel selection of the set-top cable converter (and in fact a separate portable remote control apparatus for the set-top cable converter, or a separate "universal" portable remote control apparatus, must be utilized by the cable subscriber to effectuate channel selection of the set-top cable converter). In addition, set-top cable converters, and all similar switching devices, are inconvenient, as they will not permit the cable subscriber to use the capability currently provided in most video cassette recorders (VCR or VTR [hereinafter "VCR"]) to be programmed to record a sequence of programs on different channels at different times and/or on different days. Consequently, it would be advantageous to be able to eliminate the necessity of having a separate set-top cable converter for CATV distribution systems with which the user must interact, thereby allowing each cable subscriber to be able to use the original tuner of the television receiver (or VCR, if desired), as well as the original remote control apparatus associated with the television receiver (or VCR, if desired), to make CATV channel selection.

To complete the pertinent technical discussion, it is important to note that an exception to the CATV distribution system described above, is the latest generation of state-of-the-art "cable-ready" television receivers which are able to tune the individual cable channels from the frequencies over which basic cable programming is transmitted. Accordingly, "cable-ready" television receivers do not require a separate set-top cable converter for basic cable programing. Further, the "cable-ready" television receivers will allow the hand-held remote control apparatus that is associated with the "cable-ready" television receiver for channel selection of the television receiver also to be used for channel selection of basic cable program offerings. However, whenever premium or pay-for-view cable program offerings are intended to be viewed by the cable subscriber on a "cable-ready" television receiver, a separate set-top converter (along with its associated hand-held remote control) is required to be connected to the "cable-ready" television receiver of the cable subscriber in order to descramble, or decode, the received cable signal (which is being transmitted in scrambled or coded format). Once the set-top converter is required for descrambling (or decoding) premium channels, the set-top converter must be used for receiving all channels. For the reasons cited above, it would be advantageous to be able to eliminate the need for the user to interact with this separate set-top converter that is currently required whenever the cable subscriber desires premium or pay-for-view cable programming for "cable-ready" television receivers.

It is important to note that the many advances made in fiber optic technologies to date, and transmission distribution networks related thereto, leads to the expectation that future CATV video distribution systems will be digital, and particularly, switched digital distribution systems. This will effectively mean that there will be a very large number of individual channels available for viewing by the cable subscriber, regardless of geographic location. However, at any given television receiver, the user will select a single channel for viewing, which will cause a control signal to be transmitted to a switch at the head-end of the switched digital distribution system that will cause only that channel to be transmitted digitally to that particular television receiver. The future will also see the existence of broadcast cable digital systems. A multi-purpose television interface device will be required, similar to a set-top cable converter, except that this multi-purpose interface device would be required for all users for all channels, premium or otherwise. The multi-purpose interface device will allow the user to identify which channel is to be viewed, and, in the case of switched digital distribution, will transmit the control sisal to the switch at the head-end of the switched digital distribution system; in the case of broadcast cable digital distribution, the multi-purpose interface will select the identified channel. The multi-purpose interface device will also perform the digital-to-analog conversions to the signal format at the appropriate channel frequency for which the television receiver is designed.

A prospective frontier for both CATV and video distribution systems will be video dial tone technologies and related distribution systems. It would be advantageous that a multi-purpose television interface be fully compatible with the new video dial tone technologies and related distribution systems that are expected to appear in the future.

Accordingly, it is an object of the present invention to provide a multi-purpose television interface which will be fully compatible for either switched or broadcast, digital or analog video distribution technologies which will overcome the various shortcomings contained with apparatus found in the prior art.

It is another object of the present invention to provide a universal television interface for a conventional television receiver (not "cable-ready") of a cable subscriber which will eliminate the need for a user to interact with a separate set-top cable converter to select a cable channel, corresponding to a cable program, as well as allow the cable subscriber to use the tuner in the television receiver (or VCR), including using the remote control apparatus associated with the television receiver (or VCR), to remotely select cable channels, or cable programs, and further allow the cable subscriber to be able to use a VCR(s) in conjunction therewith to permit recording of a sequence of cable programs on different cable channels at different times and/or different days.

Another object of the present invention is to provide a multi-purpose television interface for a "cable-ready" television receiver of a cable subscriber which will eliminate the need for a user to interact with a separate set-top converter to decode or descramble premium or pay-for-view cable program offerings, as well as allow the cable subscriber to use the tuner in the television receiver (or VCR), including using the remote control apparatus associated with the television receiver (or VCR), to remotely select premium or pay-for-view cable program offerings, and further allow the cable subscriber to be able to use a VCR(s) in conjunction therewith to permit recording of a sequence of premium or pay-for-view cable program offerings on different cable channels at different times and/or different days.

It is still another object of the present invention to provide a multi-purpose television interface for each cable subscriber's television receiver which will be compatible with the video dial tone technologies and related distribution systems, in the future.

Briefly, according to one embodiment of the present invention there is provided a multi-purpose interface to a television receiver for analog or digital, broadcast or switched video distribution, the television receiver disposed to receive a video signal from the distribution, the television receiver having an associated local oscillator, the local oscillator having an associated frequency during operation thereof, the interface capable of facilitating distribution of standard program offerings, or premium program offerings that are addressable or not addressable, or addressable pay-for-view program offerings, the interface comprising: a first interface means, the first interface means disposed for interfacing an analog broadcast video distribution system; a second interface means, the second interface means disposed for interfacing a broadcast digital video distribution system; and a third interface means, the third interface means disposed for interfacing a switched digital video distribution system, whereby the frequency is determined by detecting the leakage of the local oscillator by the interface means, and the multi-function interface operates to acquire the channel selected for the television receiver and shift the video signal to the frequency to which the television receiver has been tuned. The referenced first interface means for interfacing an analog broadcast video distribution system include receiving means for receiving the video signal; logic means for determining if the video signal is being transmitted in a predetermined blocked format; means for descrambling the video signal whenever required by the logic means; frequency detector means for detecting the particular leakage frequency of the local oscillator of the television receiver; blocking means for blocking the video signal from the frequency detector means; and frequency shifting means for shifting the frequency of the video signal to a frequency that is equal to the specific frequency to which the television receiver is tuned and then outputting the shifted signal to the television receiver. The referenced second interface means for interfacing a digital broadcast video distribution system include receiving means for receiving the digital video signal; logic means for determining if the digital signal is being transmitted in a predetermined blocked format; means for descrambling the digital signal whenever required by the logic means; digital-to-analog conversion means for converting the digital video signal to an analog signal; frequency detector means for detecting the particular leakage frequency of the local oscillator; blocking means for blocking the analog signal from the frequency detector means; and frequency shifting means for shifting the frequency of the analog signal to a frequency that is equal to the specific frequency to which the television receiver is tuned and then outputting the shifted signal to the television receiver. The referenced third interface means for interfacing a switched digital video distribution system include signaling means for signaling to the system head-end the identity of the selected channel; receiving means for receiving the switched digital video signal; digital-to-analog conversion means for converting the switched digital video signal to an analog signal; frequency detector means for detecting the particular leakage frequency of the local oscillator; blocking means for blocking the analog signal from the frequency detector means; and frequency shifting means for shifting the frequency of the analog signal to a frequency that is equal to the specific frequency to which the television receiver is tuned and then outputting the shifted signal to the television receiver.

According to another embodiment of the present invention there is provided a multi-purpose television interface to a television receiver for analog or digital, broadcast or switched CATV distribution, the television receiver disposed to receive a video signal from the CATV distribution, the television receiver having an associated local oscillator, the local oscillator having an associated frequency during operation thereof, the interface capable of facilitating distribution of standard program offerings, or premium program offerings that are addressible or not addressible, or addressible pay-for-view program offerings, the interface comprising: a first interface means, the first interface means disposed for interfacing an analog broadcast CATV distribution system; a second interface means, the second interface means disposed for interfacing a digital broadcast CATV distribution system; and a third interface means, the third interface means disposed for interfacing a switched digital CATV distribution system, whereby the frequency is determined by detecting the leakage of the local oscillator by the interface means, and the multi-function interface operates to acquire the channel selected for the television receiver and shift the CATV signal to the frequency to which the television receiver has been tuned. The referenced first interface means for interfacing an analog broadcast CATV distribution system include receiving means for receiving the CATV signal; logic means for determining if the CATV signal is being transmitted in a predetermined blocked format; means for descrambling the CATV signal whenever required by the logic means; frequency detector means for detecting the particular leakage frequency of the local oscillator of the television receiver; blocking means for blocking the CATV signal from the frequency detector means; and frequency shifting means for shifting the frequency of the CATV signal to a frequency that is equal to the specific frequency to which the television receiver is tuned and then outputting the shifted signal to the television receiver. The referenced second interface means for interfacing a digital broadcast CATV distribution system include receiving means for receiving the digital CATV signal; logic means for determining if the digital CATV signal is being transmitted in a predetermined blocked format; means for descrambling the digital CATV signal whenever required by the logic means; digital-to-analog conversion means for converting the digital CATV signal to an analog signal; frequency detector means for detecting the particular leakage frequency of the local oscillator; blocking means for blocking the analog signal from the frequency detector means; and frequency shifting means for shifting the frequency of the analog signal to a frequency that is equal to the specific frequency to which the television receiver is tuned and then outputting the shifted signal to the television receiver. The referenced third interface means for interfacing a switched digital CATV distribution system include signaling means for signaling to the system head-end the identity of the selected channel; receiving means for receiving the switched digital CATV signal; digital-to-analog conversion means for converting the switched digital CATV signal to an analog signal; frequency detector means for detecting the particular leakage frequency of the local oscillator; blocking means for blocking the analog signal from the frequency detector means; and frequency shifting means for shifting the frequency of the analog signal to a frequency that is equal to the specific frequency to which the television receiver is tuned and then outputting the shifted signal to the television receiver.

This invention is directed to solving these and other disadvantages of the prior art. Other objects, features, and advantages of this invention will become apparent from the following detailed description of the preferred embodiment of this invention, as illustrated in the accompanying drawings.

BRIEF DESCRIPTION OF THE DRAWINGS

These and other objects, features, and advantages of the present invention, as well as its organization, construction and operation, will be best understood from an examination of the following detailed description of an illustrative embodiment of the invention when read in connection with the accompanying drawings. Accordingly, the invention, together with the further objects and advantages thereof, may be understood by reference to the following detailed description of the preferred embodiment of the invention taken in conjunction with the accompanying drawings, in which:

FIG. 2 also depicts the operation with a separate set-top cable converter found in the prior art in those instances where the cable subscriber has a "cable-ready" television receiver, but wishes to receive either premium cable program offerings or pay-for-view cable program offerings from the cable service provider.

DETAILED DESCRIPTION OF THE PREFERRED EMBODIMENT

Figure 1:
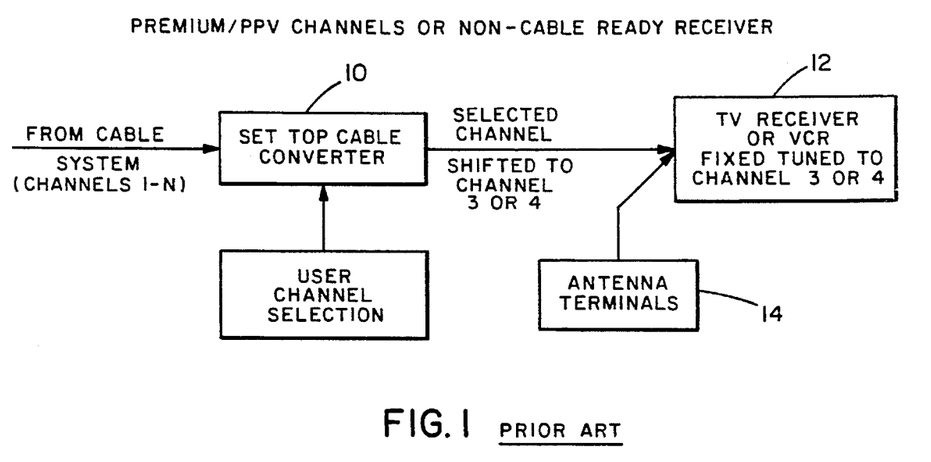
FIG. 1 is a block diagram depicting the operation of a separate set-top cable converter found in the prior art in those instances where the cable subscriber has a conventional television receiver with which to receive either the basic cable program offerings, premium cable program offerings, or pay-for-view cable program offerings from the cable service provider.

In FIG. 1, there is shown a block diagram depicting the operation of an analog broadcast CATV distribution system of the prior art in conjunction with a cable subscriber's conventional television receiver 12. If the television receiver is not "cable-ready" or if the cable subscriber wishes to receive premium or pay-per-view channels, the subscriber is required to utilize a separate set-top cable converter 10 with which to receive either the basic (or standard) cable program offerings, the premium cable program offerings, or the pay-for-view cable program offerings from the cable service provider.

Generally speaking, for a commercial analog broadcast video, or CATV, distribution system, the reception of basic cable service by the cable subscriber from the cable service provider will require the cable subscriber to have a set-top cable converter if the television receiver is not "cable-ready"; otherwise, a set-top converter is not required to receive basic cable service on a "cable-ready" television receiver. Reception of premium cable program offerings (including pay-for-view cable service) by the cable subscriber from the cable service provider, regardless of whether or not the cable subscriber has a "cable-ready" television receiver or not, will generally require the cable subscriber to have a set-top cable converter operatively connected to the television receiver. The incoming cable signal is allowed to pass to the antenna terminals of the television receiver from the set-top converter, and the cable subscriber must fixed tune the television receiver (or VCR) to either channel 3 or channel 4.

For receiving basic cable service on a television receiver that is not "cable-ready" the incoming cable signal (i.e., cable channels 1 --- n) are immediately passed to the set-top cable converter. The cable subscriber selects a desired channel (e.g., cable channel 47), and the set-top cable converter tunes to that cable channel, shifts that cable channel to over-the-air channel 3 (or channel 4), and then passes the converted cable signal to the antenna terminals of the television receiver (or VCR) of the cable subscriber. The set-top cable converter has a separate tuner which may be operated, either manually or remotely, by the cable subscriber to select the cable channel to be viewed.

For receiving basic cable service on a television receiver that is "cable-ready" a set-top cable converter is not required to receive the basic cable programming because the "cable-ready" television receiver (or VCR) is directly tunable by the cable subscriber (either manually or remotely) to cable channels 1 --- n, whereupon the incoming cable signal will be placed on the specific channel that has been selected (i.e., tuned to) by the cable subscriber. The incoming cable signals (i.e., channels 1 --- n, say channel 63), are passed directly to the particular cable terminals of the "cable-ready" television receiver of the cable subscriber, there being no requirement for the cable subscriber to fixed tune his "cable-ready" television receiver to channel 3 (or channel 4). Since the incoming cable signals are immediately passed to the "cable-ready" television receiver (or VCR) without going through a set-top cable converter, the cable subscriber may use the dedicated tuner for the "cable-ready" television receiver, either manually or remotely, in order to select a channel to be viewed (i.e., directly tunable to the cable program selected), in order to select the cable program to view on channels 1 --- n.

Receiving premium cable service, including pay-for-view, on either a "cable-ready" television receiver, or a television receiver which is not "cable-ready", requires that a set-top converter be installed to receive the incoming cable signal, and then descramble or decode the cable signal (which is being distributed by the cable service provider in a scrambled or coded format of some sort), after which the cable signal is then allowed to be passed to the antenna terminals of the television receiver of the cable subscriber. If the set-top converter is utilized for the reception of premium or pay-for-view channels, then it must be used for the reception of basic channels as well. The cable subscriber will select a channel to be viewed by using the dedicated tuner of the set-top converter, either manually or remotely, but not the tuner associated with the television receiver. The incoming cable signals from the cable service provider (i.e., channels 1 --- n, say channel 63), are initially passed to, and are converted by, the set-top cable converter. The set-top converter will descramble (or decode) the incoming signal if the incoming signal is scrambled or coded. Then the set-top converter will output the descrambled signal by shifting the signal to channel 3 (or channel 4) of the television receiver (or VCR).

Lastly, with respect to the prior art it is important to note that there are a minority of cable service providers that operate cable distribution systems which utilize separate blocking filters at the outputs of the distribution system that are used to block particular premium program offerings, or channels, to those cable subscribers who do not subscribe to them, so that the premium channel never enters the subscriber's home. A limitation to this approach is that since the number of premium channels which can be blocked is finite, eventually the cable service provider will use all the blocking capacity available for a particular subscriber, and then the cable service provider will not be able to introduce additional premium channels into the system and offer them to the cable subscriber on a premium basis.

Referring again to FIG. 1, briefly summarizing, the set-top cable converter 10 is operatively connected through the antenna terminals 14 to the conventional television receiver (or VCR) 12, which is fixed tuned to either channel 3 or channel 4. The set-top cable converter 10 is used to select the cable channels to be viewed (1 --- n, where "n" is the maximum number of channels which are available to the cable subscriber), either manually or with a portable remote control apparatus provided with the set-top cable converter by the cable service provider. After receiving the incoming cable signal, the set-top cable converter shifts the cable signal to the channel the television receiver (or VCR) has previously been fixed tuned, (i.e., to either channel 3 or channel 4). For viewing either premium program offerings or pay-for-view program offerings, the set-top cable converter contains particular internal logic to first descramble or decode the incoming signal, and then shift the descrambled or decoded signal to either channel 3 (or channel 4) to which the television receiver (or VCR) has been previously fixed tuned.

Figure 2:
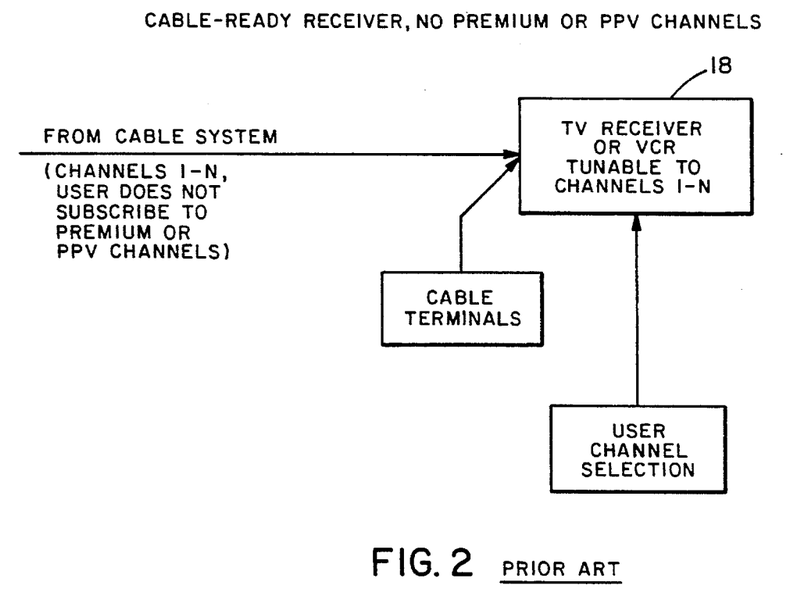
FIG. 2 is a block diagram depicting the operation without a separate set-top cable converter found in the prior art in those instances where the cable subscriber has a "cable-ready" television receiver with which to receive the basic cable program offerings, and does not wish to receive either premium cable program offerings, or pay-for-view cable program offerings, from the cable service provider.

In FIG. 2, there is shown a block diagram depicting the operation found in the prior art in those instances where the cable subscriber has a "cable-ready" television receiver 18 with which to receive the basic cable program offerings and does not subscribe to the premium cable program offerings, or pay-for-view cable program offerings, from the cable service provider. Referring to FIG. 2, the capabilities of the "cable-ready" television receiver eliminates the necessity to have a separate set-top cable converter (except in those instances when either premium program offerings or pay-for-view program offerings are intended to be viewed, in which instances FIG. 1 applies). To view basic cable program offerings, the tuner of the "cable-ready" television receiver (or VCR), including the ability to use the associated remote control for the "cable-ready" television receiver (or VCR) may be used by the cable subscriber. In the event that premium program offering or pay-for-view program offering is intended to be viewed, FIG. 1 applies, and the tuner which is associated with the set-top cable converter (or the remote control for the tuner), must be used for program selection by the cable subscriber. The set-top cable converter also contains dedicated internal logic to initially descramble or decode the incoming signal, and then shift the descrambled or decoded signal to either channel 3 or channel 4 to which the television receiver (or VCR, if desired) has been previously fixed tuned.

Figure 3:
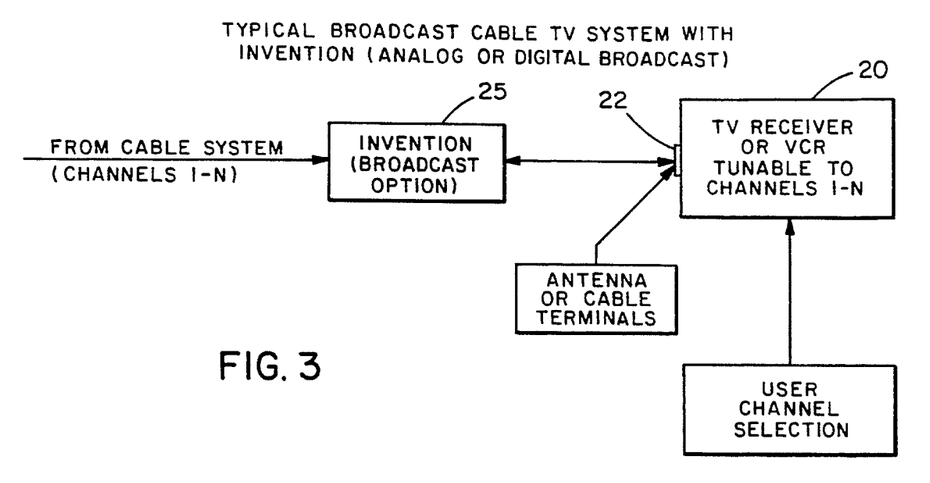
FIG. 3 is a simple block diagram depicting the multi-purpose television interface in accordance with the present invention specifically for use with a digital or analog broadcast CATV distribution system.

In FIG. 3, there is shown a simple block diagram and associated logic depicting the multi-purpose television interface 25 in accordance with the present invention particularly for use with either a digital or an analog broadcast video (or CATV) distribution system. Referring to FIG. 3, the multi-purpose television interface 25 would be available for either analog or digital broadcast video (or CATV) distribution systems. The interface 25 is physically connected to the television receiver 20, through a standard radio-frequency connector that is connected to the antenna or cable terminals 22 of the television receiver 20.

There are two inputs to the multi-purpose television interface 25. The first input comes from the cable company in the form of the incoming cable signal, which will either be clear (i.e., not scrambled), or scrambled (for premium or pay-for-view cable program offerings). The second input comes from the antenna or cable terminals of the television receiver in the form of the signal leakage associated with the local oscillator of the television receiver to which the multi-purpose television interface has been connected. This input would act as a specific control signal, the frequency of which would inform the multi-purpose television interface exactly to which channel the television receiver (or VCR) is specifically tuned. The multi-purpose television interface is predicated on this principle because there is sufficient signal "leakage" coming back to the antenna terminals of the television receiver due to the local oscillator, that a "frequency detector" as part of the multi-purpose television interface, can measure the particular frequency to which the local oscillator is tuned.

Note that with broadcast CATV distribution systems, basic cable service includes certain cable program offerings (for example, ESPN, CNN, etc.) that are transmitted by the cable service provider clear, that is in an unscrambled or uncoded format, to the cable subscriber, while certain optional premium cable offerings are transmitted in a scrambled or coded format, and which are only unscrambled to a clear format by the set-top cable converters of those particular cable subscribers who have subscribed to receive the premium cable service.

Figure 4A:
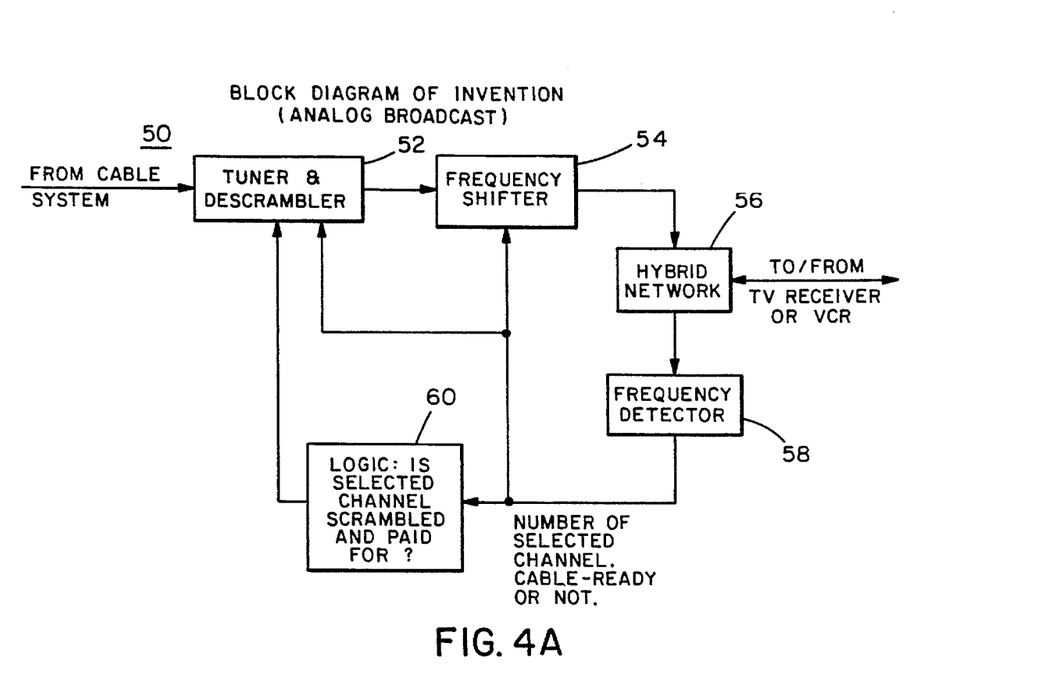
FIG. 4A is a block diagram depicting the multi-purpose television interface in accordance with the present invention for use with an analog broadcast CATV distribution system.
Figure 4B:
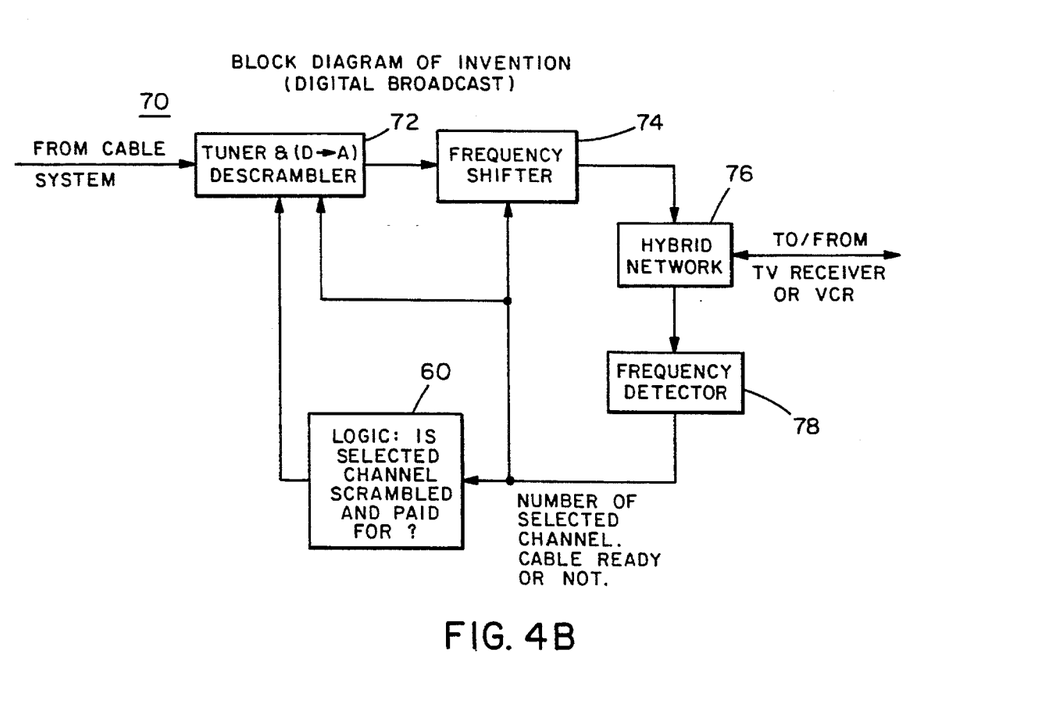
FIG. 4B is a block diagram depicting the multi-purpose television interface in accordance with the present invention for use with a digital broadcast CATV distribution system.

Referring to FIGS. 4A and 4B, should the first input for the multi-purpose television interface from the cable service provider not be scrambled, and is in a clear unblocked format, the multi-purpose television interface, since the interface also has detected exactly what specific channel (or frequency) the television receiver (or VCR) is tuned to (by detecting the leakage frequency of the local oscillator), can then act to select, from the incoming cable signal, the specific cable channel with the channel number to which the television receiver (or VCR) has been tuned, and to shift it to the frequency of the channel to which the television receiver has been tuned without the need for a set-top cable converter. Note than with this approach, the dedicated tuner of the television receiver (or VCR) has been utilized, which means that the television receiver (or VCR) may be tuned (i.e., make different channel selections) by using the manual tuner or portable remote control apparatus or programming feature that is associated with the television receiver (or VCR).

But, should the cable input to the multi-purpose television interface coming in from the cable service provider be for an optional premium program offering, or a pay-for-view program offering, the incoming cable signal will be in a scrambled or coded format. In this situation, referring to FIG. 5, the interface will be preset with an indicator of which channels are scrambled and which channels the cable subscriber in entitled to receive if the incoming cable signal is in a scrambled format, and if the cable subscriber is entitled to receive the premium program offering or pay-for-view program offering, the multi-purpose television interface will, after selecting the channel from the cable signal, descramble the channel, and then shift the channel (which is now in a clear state) to the frequency of the specific channel to which the television receiver (or VCR) has been previously tuned. Should the incoming cable signal not be scrambled, or should the cable subscriber not be entitled to receive the cable signal, the multi-purpose television interface will not descramble the cable signal, and the interface will then shift the incoming cable signal, in the format in which it is received, to the frequency of the specific channel to which the television receiver (or VCR) has been previously tuned, thereby allowing the scrambled signal to be passed on through to the television receiver where the scrambled signal will be depicted as scrambled.

Under the circumstances just stated, please note that when viewed from the head-end of the cable service provider, the multi-purpose television interface will function the same as a conventional set-top cable converter for its CATV distribution system. This also means that the multi-purpose television interface of the present invention can also be individually addressed in real time, with the indicator of which channels the cable subscriber is entitled to receive. The multi-purpose television interface of the present invention is technically compatible with all existing analog broadcast video (or CATV) distribution systems and from the viewpoint of the individual cable subscriber, this decision to select a premium program offering from the cable service provider may be accomplished in real-time or in advance.

Should the VCR tuner be used, the VCR could be programmed to activate at a sequence of one or more dates and times, with a different channel each time, in which event the multi-purpose television interface would then automatically start operating by measuring the frequency of the local oscillator, etc., when the VCR activated at the later dates and times.

Figure 6:
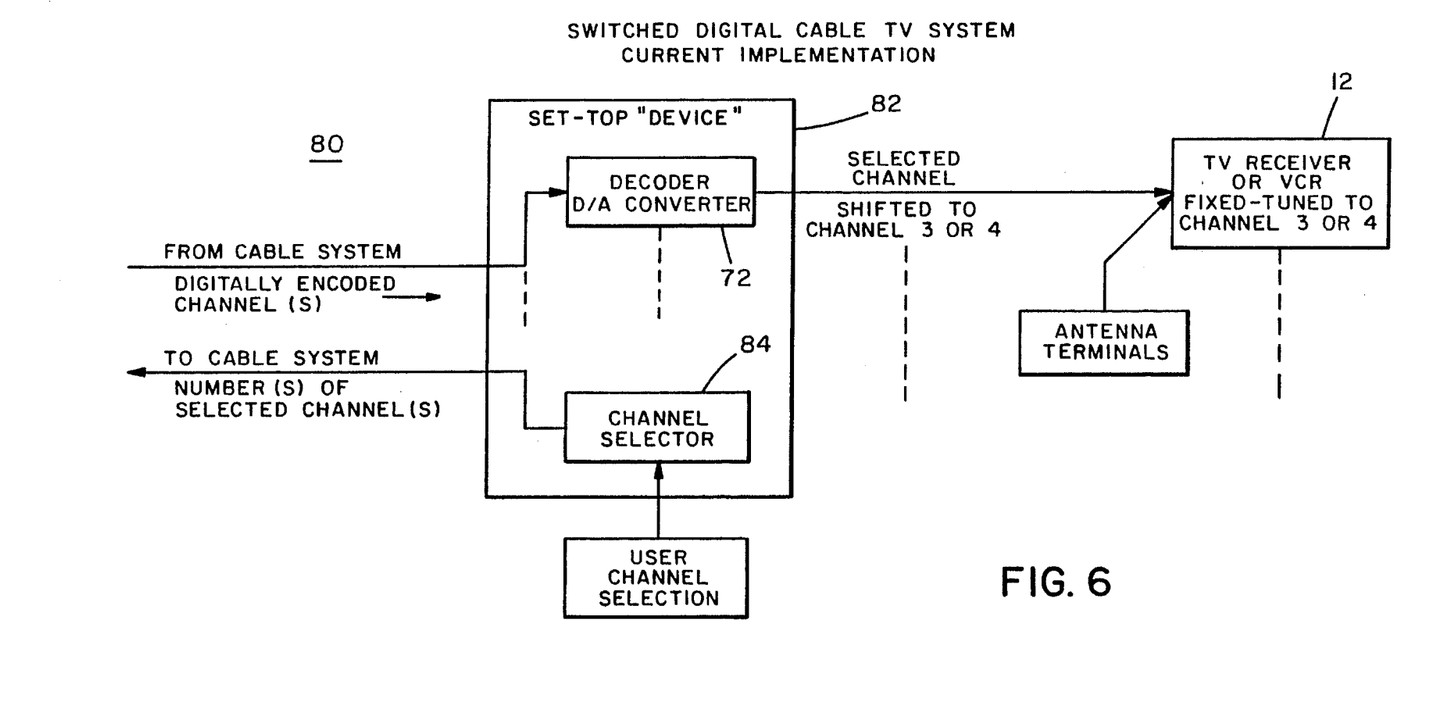
FIG. 6 is a block diagram depicting the switched digital CATV distribution system of the prior art utilizing a separate set-top "device".

Referring to FIG. 6, note that with switched digital video (or CATV) distribution systems, rather than all of the channels being transmitted by the cable company over the cable network for distribution to all of the cable subscribers, only a single channel for each active television receiver (or VCR) at the location of the cable subscriber is actually being transmitted by the cable service provider to that subscriber. In general, a subscriber would have the capability of receiving up to some limited number (e.g., two to four) of channels simultaneously, corresponding to the number of television receivers (or VCRs) that are available to be operated simultaneously. With the prior art, using a device that, to the user, is similar to a set-top cable converter in a broadcast system, the cable subscriber sends a signal down to the head-end of the cable service provider, informing the cable service provider of the decision to select a program offering on a particular channel (say channel 63). The program offering will thereafter be sent in digital format to the location of the cable subscriber. Within the set-top device, the incoming digital signal is passed through a digital-to-analog converter to convert the digital signal to an analog signal representing the specific program offering selected by the cable subscriber, and then the analog signal is shifted to channel 3 or 4, to which the television receiver has been previously fixed tuned. But, should the cable subscriber select a premium program to which the subscriber has not subscribed, the head-end of the cable service provider would not transmit the digital signal, but instead transmit a message on to the cable subscriber's television receiver to the effect that if the cable subscriber would like to subscribe to the premium program offering, the subscriber should notify the cable service provider immediately.

Figure 7:
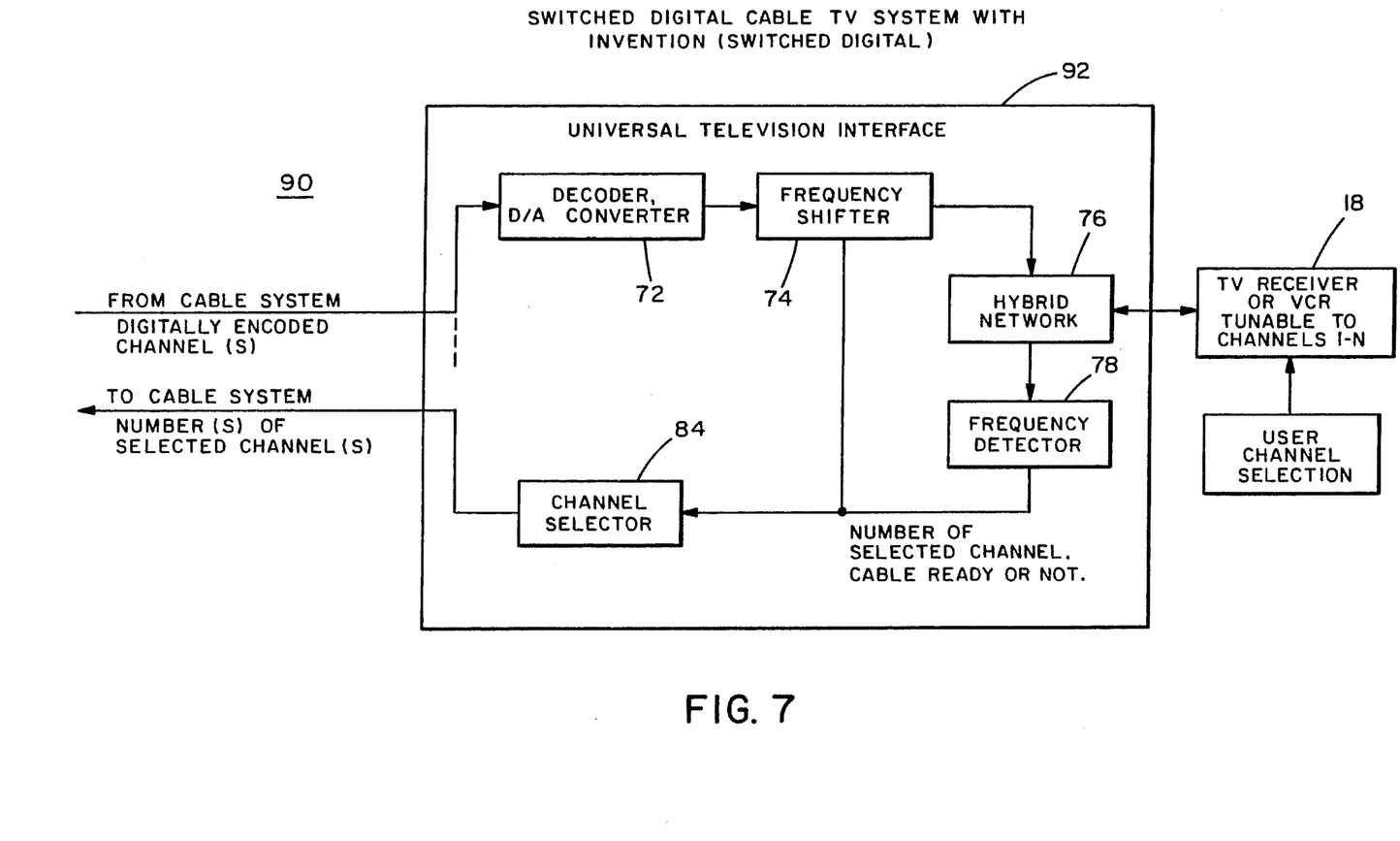
FIG. 7 is a block diagram depicting the switched digital CATV distribution system utilizing the multi-purpose television interface in accordance with the present invention.

Referring to FIG. 7, with the multi-purpose television interface of the present invention, the user would tune each television receiver (or VCR) to the channel that is numbered with the number of the cable channel selected for viewing on that television receiver (or recording on that VCR). The multi-purpose television interface would detect the number of the selected channel and would send the request to the cable head-end. The multi-purpose television interface would then receive the digital signal from the cable system, convert it from digital to analog, and shift the analog signal to the channel to which the television receiver (or VCR) had been previously tuned.

In FIG. 4A, there is shown a block diagram depicting the multi-purpose television interface in accordance with the present invention for use with an analog broadcast video (or CATV) distribution system. As shown in FIG. 3, the multi-purpose television interface 25 is positioned between the cable service provider and the television receiver of the cable subscriber. Therefore, the incoming cable signals (channels 1 --- n) will always initially pass through the multi-purpose television interface, prior to entering the television receiver (or VCR). Referring to FIG. 4A, the multi-purpose television interface 50 performs the function of the set-top cable converter, using a tuner and associated descrambler 52 to select the channel, to descramble the scrambled format of the cable signal whenever required by the associated logic 60, and then, by frequency shifter 54, presents the cable signal to the antenna terminals of the television receiver on the specific channel frequency to which the television receiver has been tuned by the cable subscriber. The hybrid network 56 makes certain that the shifted signal from the cable company passes only to the television receiver (or VCR), and that the outgoing signal leakage of the local oscillator from the television receiver (or VCR) passes only to the multi-purpose interface's frequency detector 58 and associated logic 60. The frequency detector 58 detects the leakage from the local oscillator signal from the television receiver's signal, and determines what frequency (or channel) the television receiver's tuner is tuned to, and outputs the number of the channel that has been selected by the tuner of the television receiver as well as whether or not the television receiver is a conventional television receiver or a "cable-ready" television receiver. The frequency shifter 54 acts to shift the signal to be output to the frequency (either cable or over-the-air) of that channel (depending on whether or not the television receiver (or VCR) of the cable subscriber is "cable-ready").

Referring to FIG. 4A, alternatively, another design approach for the multi-purpose television interface is to utilize a frequency-selective filter network in place of the previously discussed hybrid network to direct the paths of the video signal to the television receiver and the local oscillator signal to the frequency detector of the multi-purpose interface.

In FIG. 4B, there is shown a block diagram depicting the multi-purpose television interface in accordance with the present invention for use with a digital broadcast CATV (or video) distribution system. Referring to FIG. 4B, the multi-purpose television interface 70 performs the function of the set-top cable converter, using a tuner and associated descrambler and digital-to-analog converter 72 to select the channel, to descramble the scrambled format of the cable signal whenever required by the associated logic 60, to convert the cable signal to an analog output signal, which will be passed to the frequency shifter 74, and, by frequency shifter 74, to present the cable signal to the antenna terminals of the television receiver on the specific channel frequency to which the television receiver has been tuned by the cable subscriber. Again, the hybrid network 76 makes certain that the shifted signal from the cable company passes only to the television receiver (or VCR), and that the outgoing signal leakage of the local oscillator from the television receiver (or VCR) passes only to the multi-purpose interface's frequency detector 78 and associated logic 60. The frequency detector 78 detects the leakage from the local oscillator signal from the television receiver's signal, and determines what frequency (or channel) the television receiver's tuner is tuned to, and outputs the number of the channel that has been selected by the tuner of the television receiver as well as whether or not the television receiver is a conventional television receiver or a "cable-ready" television receiver. The frequency shifter 74 acts to shift the signal to be output to the frequency of that channel.

Referring to FIG. 4B, alternatively, another design approach for the multi-purpose television interface is to utilize a frequency-selective filter network in place of the previously discussed hybrid network to direct the paths of the video signal to the television receiver and the local oscillator signal to the frequency detector of the multi-purpose interface.

The multi-purpose television interface is able to determine whether or not the particular television receiver (or VCR) is "cable ready" because the local oscillator signals will be different depending on whether the television receiver is being tuned to a cable channel frequency or an over-the-air channel frequency.

Figure 5:
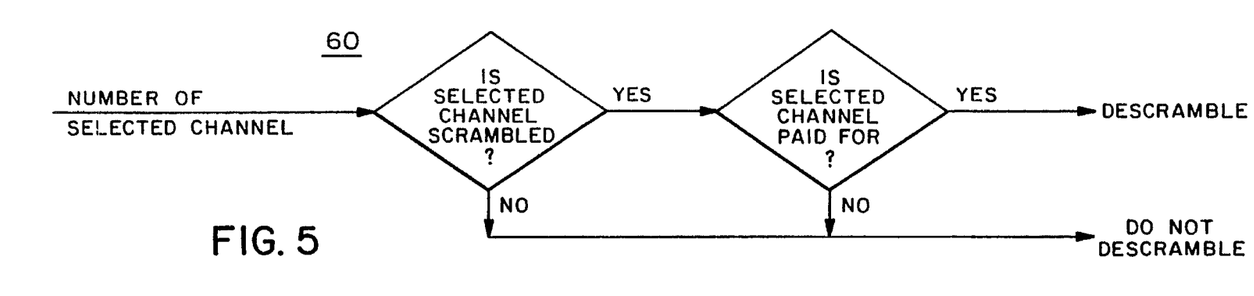
FIG. 5 is a block diagram depicting the logic associated with the multi-purpose television interface in accordance with the present invention, as previously shown in FIGS. 4A and 4B.

In FIG. 5, there is shown a block diagram depicting the logic associated with the multi-purpose television interface in accordance with the present invention, as previously shown in FIGS. 4A and 4B. Referring to FIG. 5, the number of the selected channel is then passed to the associated logic 60 of the multi-purpose interface to determine if the selected channel is scrambled, or clear. If affirmative (i.e., "yes"), the query is passed to the next stage and determination is made as to whether the cable subscriber has paid for the cable program that has been selected. If affirmative (i.e., "yes"), a command is passed to the descrambler to descramble the incoming cable signal. Unless the answer to both questions are "yes", the multi-purpose interface will not descramble the incoming cable signal. This logic can be implemented by two logical "AND gates" (e.g., is the selected channel scrambled? If "yes", signal is allowed to pass; if "no", the signal drops out. Is the selected channel paid for? If "yes", the signal is allowed to pass; if "no", the signal drops out). Therefore, unless both determinations are "yes", the outgoing signal will not be descrambled by the multi-purpose interface, and the signal will output the multi-purpose interface either scrambled (i.e., determinations provide some combination of "yes" and "no"), or not scrambled (i.e., both determinations are "yes"); if both determinations are "yes", the interface will descramble the signal. Obviously, the sequence of the two questions, or gates, can be reversed, with the same result. Following the frequency shift of the incoming signal to the channel selected by the cable subscriber, the subscriber will see a clear signal if it was transmitted clear or if it was transmitted scrambled and has been paid for by the subscriber.

In FIG. 6, there is shown a block diagram depicting the switched digital CATV (or video) distribution system utilizing a separate set-top "device" (e.g., considered to be prior art). Referring to FIG. 6, since the incoming cable signals are all digitally encoded and only one channel is transmitted by the cable company to the subscriber for each television receiver or VCR, the set-top "device" 82 will perform the function of transmitting a signal to the digital switch for the CATV distribution system identifying the specific channel frequency to be transmitted to the cable subscriber, decoding the cable signal (if required), converting it from digital-to-analog, and presenting the analog signal to the antenna terminals of the television receiver 12 on the specific channel 3 or 4 to which the television receiver has been previously fixed tuned. The set-top "device" 82 can be used to reserve a limited number (e.g., two to four) signals for separate viewing or reception by different television receivers or VCRs at the location of the cable subscriber. With the prior art, the cable subscriber fixed tunes the television receiver to channel 3 or 4, and then selects the cable channel by using the set-top "device", and the set-top "device" outputs the signal on channel 3 or 4 to the television receiver.

In FIG. 7, there is shown a block diagram depicting the switched digital CATV (or video) distribution system utilizing the multi-purpose television interface 92 in accordance with the present invention. Referring to FIG. 7, with the multi-purpose interface 92, the subscriber would not have to fixed tune his television receiver to channel 3 or 4. The cable subscriber would select his cable selection on his television receiver tuner (channels 1 --- n), which would be transmitted to the head-end of the cable service provider. By measuring the frequency of the local oscillator, as previously described, the multi-purpose interface would determine two pieces of information, namely: (i) the number of the selected channel which the subscriber has tuned his television receiver; and (ii) whether the television receiver is "cable-ready" or not. The multi-purpose interface 92 would then input the number of the selected channel into a channel selector device 84, which would transmit the selected channel number down to the head-end of the cable service provider, which would then transmit the selected program offering to the cable subscriber. The cable service provider would transmit the digital encoded signal of the selected channel to the subscriber, with the incoming signal being decoded and converted from digital-to-analog, and then the signal would be shifted to the frequency to which the television receiver had been tuned and output to the receiver through hybrid network 76. The cable subscriber could select a number of different programs offerings to view simultaneously, depending on the number of television receivers, or VCRs, that were operated at this location.

Referring to FIG. 7, alternatively, another design approach for the multi-purpose television interface is to utilize a frequency-selective filter network in place of the previously discussed hybrid network to direct the paths of the video signal to the television receiver and the local oscillator signal to the frequency detector of the multi-purpose interface.

A specific embodiment of a novel apparatus and method for a multi-purpose television interface for switched or broadcast video distribution has been described for the purposes of illustrating the manner in which the present invention may be used and made. The features of the present invention which are believed to be novel are set forth below with particularity in the appended claims. It should be understood that the implementations of other variations and modifications of the invention in its various aspects will be apparent to those skilled in the art and that the present invention is not limited thereto by the specific embodiment described. It is therefore contemplated to cover by the present invention any and all modifications, variations or equivalents that fall within the true spirit and scope of the basic underlying principles disclosed and claimed herein.

What is claimed is:

1. A method for selecting a video signal broadcast by a video distribution system for display on a television receiver, the television receiver having a channel selector, said method comprising the steps of:

selecting a particular video signal using the channel selector of the television receiver;

detecting a specific channel to which the television receiver is tuned, wherein the specific channel designates a selected video signal;

acquiring the selected video signal from the video distribution system; and shifting the selected video signal to the specific channel to which the television receiver is tuned.

2. A method according to claim 1 wherein the television receiver comprises a local oscillator and wherein the step of detecting the specific channel to which the television receiver is tuned is performed by detecting the frequency of a leakage signal from the local oscillator.

3. A method according to claim 2 further comprising the step of detecting that the television receiver is turned on and wherein the step of detecting the frequency of the leakage signal includes detecting the presence of the leakage signal.

4. A method according to claim 1 wherein the frequency of the local oscillator of the television receiver indicates the selected video signal.

5. A method according to claim 1 wherein the selected video signal is an analog signal.

6. A method according to claim 1 wherein the selected video signal is a digital signal.

7. A method according to claim 1 wherein the selected video signal is a switched video signal.

8. A method according to claim 6 further comprising the step of converting the digital signal to an analog signal before shifting the selected video signal to the specific channel to which the television receiver is tuned.

9. A method according to claim 7 further comprising the step of converting the digital signal to an analog signal before shifting the selected video signal to the specific channel to which the television receiver is tuned.

10. A method according to claim 1 wherein the selected video signal has been scrambled.

11. A method according to claim 10 further comprising the step of descrambling the selected video signal.

12. A method according to claim 1 further comprising the step of determining whether the selected video signal is scrambled.

13. A method according to claim 1 further comprising the step of determining whether the selected video signal is a pay-per-view signal.

14. A method according to claim 7 further comprising the step of transmitting a signal representative of the selected video signal to the video distribution system before acquiring the selected video signal from the video distribution system.

15. An apparatus for selecting a signal broadcast by a video distribution system for display by a television receiver, said apparatus comprising:

a frequency detector having an input coupled to the television receiver for detecting a specific channel to which the television receiver is tuned and an output for outputting a signal indicated by the specific channel to which the television receiver is tuned, wherein the specific channel indicates a selected video signal;

a tuner having a first input coupled to the output of the frequency detector, a second input for receiving a signal including the selected video signal from the video distribution system and an output, wherein the tuner selects the selected video signal based upon the output of the frequency detector; and a frequency shifter having a first input coupled to the output of the tuner, a second input coupled to the output of the frequency detector and an output coupled to the television receiver, wherein the frequency shifter shifts the selected video signal to the specific channel to which the television receiver is tuned for display by the television receiver.

16. An apparatus according to claim 15 wherein the television receiver comprises a local oscillator and wherein the frequency detector detects the frequency of a leakage signal from the local oscillator.

17. An apparatus according to claim 16 wherein the frequency detector detects the presence of the leakage signal.

18. An apparatus according to claim 15 further comprising a logic unit and a descrambler, the logic unit having an input coupled to the output of the frequency detector and an output coupled to an input of the descrambler, wherein the logic unit determines whether the selected video signal is scrambled and if so directs the descrambler to descramble the selected video signal.

19. An apparatus according to claim 18 wherein the logic unit determines whether a customer is entitled to receive the selected video signal.

20. An interface for a tuner of a television receiver for enabling a user to select a signal broadcast by a video distribution system directly through the tuner of the television receiver, the interface comprising:

a detector coupled to antenna terminals of the television receiver for detecting the frequency of a leakage signal from a local oscillator included in the television receiver, the leakage frequency indicating a selected video signal;

a tuner coupled to the detector and operable to acquire the selected video signal from the video distribution system, the acquisition of the selected video signal being made in response to the leakage frequency detected; and a frequency shifter coupled to the tuner and operable to shift the frequency of the selected video signal to the frequency to which the television receiver is tuned, and to output the shifted signal to the television receiver for display.

21. An apparatus according to claim 20 wherein the detector also detects the presence of the leakage signal from the local oscillator.

22. An interface according to claim 20 wherein the tuner of the television receiver is controlled by a remote control unit.

23. An interface according to claim 20 wherein the selected video signal is analog.

24. An interface according to claim 20 wherein the selected video signal is digital.

* * * * *